Sept. 15, 1959 H. L. BAUMBACH ET AL 2,903,942
CONTINUOUS OPTICAL REDUCTION MOTION PICTURE PRINTER
Filed Aug. 5, 1955
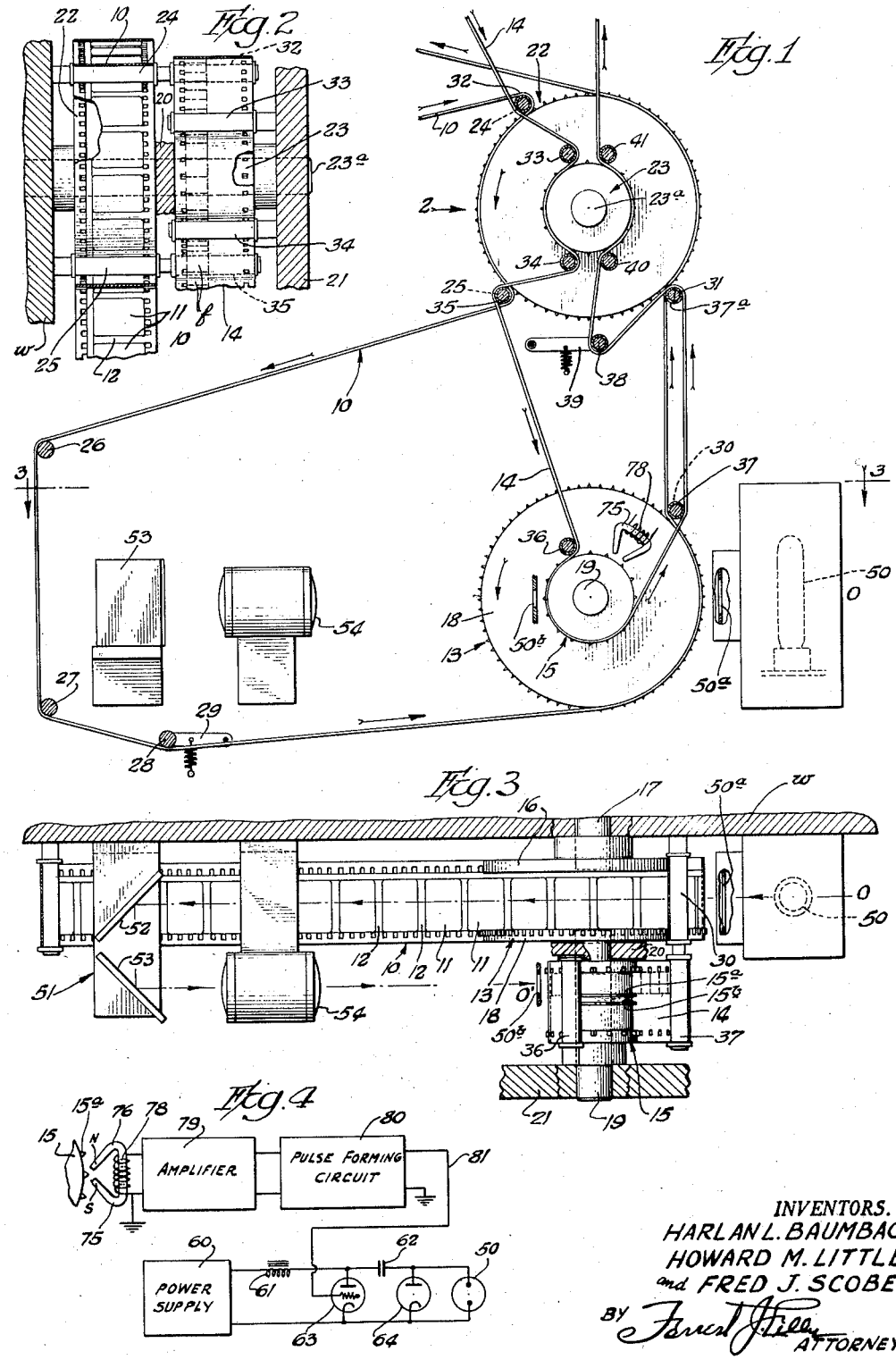
INVENTORS.
HARLAN L. BAUMBACH,
HOWARD M. LITTLE
and FRED J. SCOBEY
BY
ATTORNEY.

— # United States Patent Office 2,903,942
Patented Sept. 15, 1959

2,903,942

CONTINUOUS OPTICAL REDUCTION MOTION PICTURE PRINTER

Harlan L. Baumbach and Howard M. Little, Los Angeles, and Fred J. Scobey, Van Nuys, Calif., assignors to Unicorn Engineering Corporation, Los Angeles, Calif., a corporation of California Application August 5, 1955, Serial No. 526,704

1 Claim. (Cl. 88—24)

This invention relates generally to continuous optical motion picture printers, and a general object of the invention is the provision of an improved high speed continuous optical printer of increased versatility, making possible certain types of optical reduction or enlargement printing which are outside the abilities of continuous optical printers as heretofore known. One broad purpose of the invention is to provide a continuous optical reduction printer capable of producing a reduction print while eliminating portions of what is contained on the printing film.

A present important application of the invention, which will be adopted for illustrative purposes, but without intention of limitation thereto, consists in the making of a 16 mm. print from a 35 mm. negative (or positive) according to certain existing American standards. Continuous optical motion picture reduction printers are not, to our knowledge, in use today, though have been proposed in the past, e.g., see Patent No. 1,786,220. In such printers, the continuously traveling negative film is illuminated through a slit from a conventional light source, and a reduced optical image of the illuminated portion of the negative is formed by a suitable projection lens on the continuously traveling positive film. According to existing American standards for 35 mm. sound motion picture film, the frames on 35 mm. film are spaced a substantial distance from one another (.117"). The frames on 16 mm. film are, however, required to be positioned immediately contiguous to one another. Now the making of such a 16 mm. print without frame spaces, from a standard 35 mm. negative, or positive, having frame spaces, is an impossible assignment for such a continuous optical reduction printer as described above, it being evident that with such a printer, the frame spacings or "lines" on the negative must inescapably be reproduced on the positive. Therefore, in order to conform to certain specified motion picture standards, 16 mm. prints from 35 mm. negatives have necessarily been made heretofore in the relatively slow speed step or intermittent type of optical reduction printer. With that type of printer, of course, complete frames are printed while the film is stationary, and the size of the optically projected frame images may readily be enlarged so as to eliminate the frame spaces. The size of the projected image then satisfies American standards.

This optical adjustment to eliminate frame spaces or "lines" cannot be availed of, however, with the previously known continuous optical printer. In such printers, both the negative and positive film strip are in continuous linear motion, and the train of optical images of successive film frames projected from the negative onto the positive is also in continuous linear motion. Assuming the simplest example, if a print is to be made in this type of optical printer without reduction (or enlargement), the negative and positive film strips are driven at the same linear speed, and, with 1-to-1 optical magnification ratio (negative frame size to positive frame image size), the train of projected optical frame images travels at the same speed as the positive, and can be printed on the positive. It will be seen that there is an essential requirement of equal linear speed of positive film strip and projected image train, and that this holds for previously known continuous optical film printing whether at 1-to-1 optical magnification ratio, or in case of optical reduction or enlargement.

If a reduction print is being made, e.g., a 16 mm. positive from a standard 35 mm. negative, the film frames of the negative and positive film strips will travel at 1-to-1 (synchronously) if the 16 mm. positive is driven with a speed reduction of 2½-to-1, this being a consequence of standard sprocket hole spacing dimensions of 35 and 16 mm. stock. The train of reduced optical images projected from the 35 mm. negative will then travel at the same linear speed as the 16 mm. positive film strip if there is established a corresponding optical reduction ratio, i.e., 2½-to-1; and under these conditions, a continuous optical reduction print can be made.

However, in the process described in the foregoing paragraph, everything on the 35 mm. negative film, frames as well as spaces therebetween, is necessarily reproduced on the 16 mm. positive, so that the standardized 16 mm. positive, with no spaces between successive frames, cannot be printed.

According to the present invention, the optical projection system is adjusted to provide less optical reduction than the normal 2½-to-1, the positive image being increased in size so that the previously existing spaces between frames are just eliminated. This result is attained when the optical reduction is set at 2.15-to-1. Having made this optical adjustment, it will be seen that the train of projected optical film frame images will, however, then travel at a greater linear speed than the speed of the 16 mm. positive film strip, so that there is now an appreciable degree of relative longitudinal motion between the train of projected optical images and the positive film strip onto which it is to be printed. Printing with the ordinary light system has thereby been made impossible, because the light in such a system is sustained while an appreciable degree of motion takes place between projected image and positive film strip on which the image is being printed. However, according to the present invention, the difference in linear speed between the positive film strip and the train of optical images to be printed thereon is eliminated as a factor by use of a high intensity pulsed printing light flash, of such extremely short duration (of the order of a few microseconds) that any relative movement or "slip" between the traveling positive film strip and the traveling optical image that occurs during the exposure is less than can be resolved by the projection lens. The flash is synchronized to occur in timed sequence with passage of successive pairs of corresponding 35 and 16 mm. film frames past the 35 and 16 mm. printing apertures.

The invention will be better understood from the following detailed description of one illustrative embodiment thereof, reference for this purpose being had to the accompanying drawing, in which:

Fig. 1 is a schematic side elevational view of a printing system in accordance with the invention, certain frame members together with conventional supply and take-up devices for the film strips being omitted for simplicity of illustration;

Fig. 2 is an elevational view of the upper film sprockets of the system of Fig. 1, the view being taken in the direction of the arrow 2 in Fig. 1;

Fig. 3 is a view taken in accordance with line 3—3 of Fig. 1; and

Fig. 4 is a schematic diagram showing an electrical system for energizing the printing lamp of the system of Fig. 1.

Referring first to Figs. 1–3, numeral 10 designates generally a standard 35 mm. negative film strip having successive standard film frames 11 thereon, spaced by spaces or "frame lines" 12 whose width is .117". This negative film strip passes over a 35 mm. 64-tooth film sprocket 13, being supplied thereto and removed therefrom by devices to be presently described. At 14 is designated a raw positive film strip onto which a 16 mm. print is to be produced, this strip passing over a 16-tooth sprocket 15 for 16 mm. film, the latter being located coaxially with and immediately adjacent to 35 mm. sprocket 13. The film 14 may be standard 16 mm. positive stock, and the sprocket 15 a 16-tooth sprocket for standard 16 mm. stock. There has been shown, however, the case of a positive film strip of the present standard 35-32 mm. type, and a sprocket 15 capable of handling either 35-32 mm. or 16 mm. film. As is well known to those skilled in the art, 35-32 mm. stock is 35 mm. in width, and adapted to take two 16 mm. prints side by side, eventually to be split and trimmed to produce two 16 mm. standard prints. The sprocket holes of this film are spaced longitudinally according to 16 mm. standards. The sprocket 15 will take not only this 35-32 mm. stock, but also has narrow flanges 15a and 15b near its center, positioned as indicated in Fig. 3, adapting it optionally to support standard 16 mm. film stock. For convenience hereinafter, the positive film strip will be referred to as 16 mm. film, and it will be understood that this film may be either the standard 16 mm. stock, or 35-32 mm. stock from which 16 mm. film will be made by splitting and trimming. In the drawings, individual film frames f to be printed on the raw "16 mm." film 14 are shown in phantom lines, and these are shown contiguous to one another, i.e., without frame lines.

In the illustrative example, the 35 mm. sprocket 13 comprises one freely rotatably outside flange 16, without sprocket teeth, mounted on a shaft 17 journaled in suitable bearings in main frame wall w, and an entirely separate flange 18 provided with standard sprocket teeth, as indicated. The flange 18 is fixed on a shaft 19, and this shaft 19 also has fixed thereto the sprocket 15, and is freely journaled in suitable bearings in support brackets partially illustrated in Fig. 3 at 20 and 21. Thus the space between the flanges 16 and 18 of sprocket 13 is entirely open for accommodation of the optical system presently to be described. The shaft 19 fixes sprocket 15 to the toothed flange 18 of sprocket 13, and thus synchronizes the two. Both sprockets are driven by the film strips running thereover.

The film strips may be supplied to and taken off the sprockets 13 and 15 in various ways, though the present invention utilizes a film drive system having certain novel features and advantages, and which will now be described. Immediately above sprocket 13 is a 64-tooth 35 mm. sprocket 22 for film strip 10, and immediately above sprocket 15 is a 16-tooth 35-32 mm. sprocket 23 for the 16 mm. film strip. These are fixed on a continuously driven shaft 23a, driven by suitable drive gear and motor, not necessary to illustrate, and journaled in suitable bearings in wall w and brackets 20 and 21.

The 35 mm. negative film strip 10, supplied from the negative film supply roll, not shown, and understood to be supported in any conventional fashion, passes first around guide roller 24, and thence over one side of sprocket 22 to guide roller 25 (Fig. 2). At this point it may be mentioned that certain guide rollers, such as 24 and 25, are coaxial with and journaled on the same supporting shaft as a similar guide roller for the 16 mm. film. The arrangement is best seen in Fig. 2. Beyond guide roller 25, the negative is formed into a large loop, so as to encircle a portion of the later described optical projection system, passing for this purpose around guide rollers 26 and 27, thence over tensioning roller 28 carried by spring tensioned pivoted arm 29, and from there onto the bottom and around the far side of sprocket 13 to a guide roller 30 (Fig. 3). From the latter the negative film is taken vertically to a guide roller 31 (understood to be located behind and coaxial with the 16 mm. film roller shown) positioned adjacent sprocket 22, from which the film passes around the far side of driven sprocket 22, and thence to the film take-up device, not shown.

The 16 mm. raw positive film strip 14, supplied from a usual supply roll, not shown, passes first under a guide roller 32 concentric with roller 24 (Fig. 2), then around guide roller 33 adjacent to sprocket 23, down around the first side of sprocket 23, under roller 34, then over roller 35, down and under guide roller 36 adjacent to sprocket 15, around the front side and the bottom of the latter, thence over guide roller 37, up and around guide roller 37a, then down and under tensioning roller 38 carried by pivoted spring tensioned arm 39, up to guide roller 40 adjacent sprocket 23, around the far side of the latter, and off to the take-up device after passing under guide roller 41.

Attention is now directed to the fact that the tensioning roller 28 for the 35 mm. film strip 10 exerts a backward tension on the portion of said film strip leading to sprocket 13, tending to rotate the toothed flange 18 of the latter in a backward or clockwise direction. At the same time, the tensioning roller 38 for the film strip 14 exerts a forward tension on that portion of said film strip leading from sprocket 15, tending to rotate the sprocket 15 in a forward or counterclockwise direction. The toothed flange 18 of sprocket 13 and the sprocket 15, which will be recalled to be fixed to one another, are thus pulled in opposite directions by tensioned sections of the two film strips. As is well known to those skilled in the art, standard sprocket teeth fit standard film sprocket holes with a certain play or clearance in the direction of drive. Accordingly, the forward edges of the 35 mm. film sprocket holes pull backwardly on the teeth of sprocket flange 18, and the rearward edges of the 16 mm. film sprocket holes pull forwardly on the teeth of sprocket 15, the opposite edges of the sprocket holes in each case having a slight clearance from the sprocket teeth. Under these conditions no slippage of the film strips relative to one another can occur in passing over the sprockets 13 and 15, and a stabilized drive is attained, the two film strips driving the sprockets 13 and 15 at the linear speed determined by the drive of the sprockets 22 and 23.

The illustrative optical system comprises electronic luminescent gaseous discharge flash tube 50 positioned in back of the film passing over the 35 mm. sprocket 13, on an optic axis O—O' intersecting the center of the sprocket. A light aperture 50a, of a size to permit illumination of successive film frames, is positioned on the optic axis between sprocket 13 and lamp 50. A 180° reflecting system at 51, consisting in this instance of a pair of 45° angle front surface mirrors 52 and 53, is adapted and positioned to bend the optic axis through two right angle turns, and to offset it so as to properly intersect the sprocket 15, as shown in Fig. 3. An optical projection lens 54 is positioned on axis O—O' between the reflectors and sprockets 15, and a 16 mm. light aperture 50b is properly positioned in front of sprocket 15.

Standardized 35 mm. film has four perforations per film frame, and is of course intermittently moved or "pulled down" in motion picture apparatus a "pitch" distance equal to four times the center-to-center distance of successive perforations in order to bring successive frames before the light aperture. Standard 16 mm. (or 35-32 mm.) film, on the other hand, has one perforation per frame. It will be seen that "pitch" distance is also the distance from center-to-center of successive film frames, and includes the spacing, if any, between successive frames. According to existing standards, the pitch distance for 35 mm. film is 2½ times the pitch distance for 16 mm. film. A 35 mm. sprocket of 64 teeth and a 16 mm. sprocket of 16 teeth, fixed to one another, synchronize the 35 and 16 mm. film strips frame-for-frame, and provide the necessary 2½-to-1 reduction in linear film strip travel between negative and positive. The requirement is actually that the number of teeth be in the ratio of 4-to-1. Of course, by eliminating every other tooth on either sprocket, this ratio could be altered without disturbing the essential relationships. According to principles of the invention briefly explained hereinabove, the positioning and adjustment of the optical objective is then made such that an optical reduction of less than 2½-to-1, in the present case, 2.15-to-1, is established between the negative and positive films, such that the horizontal edges of successive film frames on the 16 mm. positive just coincide. It will be seen that the two films have been placed at conjugate foci of the projection system whose focal distances bear a ratio to one another (in this case, 2.15-to-1) which differs from the ratio of the linear speeds of the two films (2.5-to-1), with the consequence that the projected frame images travel at a speed differing from the speed of the film which they are to expose.

The flash tube 50, whose short flash interval time eliminates the effect of this relative movement, may be any suitable luminescent gaseous electron discharge tube capable of producing a high intensity printing light of short duration, of the order of a few microseconds. Such flash tubes, which are now quite well known in high speed photography, are generally flashed by discharge of a storage condenser, whose discharge is controlled by conduction of a thyratron in circuit therewith, the control electrode of the thyratron being triggered by a voltage pulse periodically conducted thereto. A suitable power supply circuit charges the storage condenser between periods of discharge. Circuits of this type are so well known in the art that no specific illustration need be given herein. Reference may be had to the numerous patents issued in this field to Harold E. Edgerton. Fig. 4, however, shows a conventionalized system of this general character. A D.C. power supply unit 60 feeds a circuit containing a series choke coil 61, storage condenser 62, and the flash tube 50. Across this circuit, between the choke coil and condenser, are connected the cathode and anode of thyratron 63, whose control electrode receives triggering voltage pulses to initiate conduction through the tube. When the thyratron conducts, condenser 62 discharges through the thyratron and flash tube 50. Between flashes, the storage condenser is charged from the power supply unit through rectifier 64, the choke coil suitably limiting the current flow.

The circuit is triggered once for each film frame passage past the printing position by a reluctance pick-up device 75, comprising a permanent magnet in the form of a yoke 76 having an air gap and through whose magnetic field successively pass the sprocket teeth 15a of 16 mm. film sprocket 15. Each time a sprocket tooth 15a passes through the field of the gap of yoke 76, a voltage pulse is generated in the yoke winding 78, and this pulse is amplified by amplifier 79, and then transmitted to a pulse forming circuit 80. The latter consists of any one of various well known forms of circuitry designed to produce a very steep fronted, short duration positive going voltage pulse or "spike," which is impressed via circuit 81 on the control electrode of the thyratron 63 to cause the thyratron to conduct, and so permit discharge of the storage condenser through flash tube 50.

The condenser discharge in this type of circuit occurs in a time duration of a few microseconds, and the light flash is of the same short duration, but of high intensity, as well understood by those familiar with circuits of this character. At the end of the condenser discharge, the thyratron stops conducting, and the condenser is recharged through the rectifier, which completes the cycle.

The flash tube 50 is thus flashed as each tooth of 16 mm. sprocket 15 passes the pick-up device 75. Since there is one tooth on this sprocket 15 for each 16 mm. film frame, and also for each 35 mm. film frame, the flashes are synchronized with the films. Flashes while the 35 mm. film frames are in register with the light aperture 50a are secured by proper location of the reluctance pick-up device 75 relative to the 16 mm. sprocket 15, and by so threading the films on the sprockets 13 and 15 that a full film frame is in register with the light aperture when a tooth of sprocket 15 passes the pick-up 75.

With such a system, the flash duration can easily be little as a few microseconds, permitting high speed film travel, of the order of 300 feet per minute for the 35 mm. film strip, without the occurrence of as much relative movement between optical printing image and sensitized film as can be resolved by the projection lens.

Attention is directed to the reversibility of the system. Thus, if desired, by a simple obvious modification, a standard 35 mm. film can be printed, with frame spaces, from a 16 mm. film not having frame spaces.

The invention has been disclosed in a typical illustrative form in a present important application; it is to be understood, however, that various changes and improvements may be made without departing from the spirit and scope of the invention as defined in the appended claim.

We claim:

In a continuous optical reduction printer for printing 16 mm. film frames without frame spaces on a sensitized film strip from a 35 mm. developed printing film strip having frame spaces, said film strips having standard perforations for 16 mm. and 35 mm. film, respectively, the combination of: an optical projection system having an optic axis, means for guiding and synchronizing the 35 mm. printing film strip and the sensitized film strip for continuous travel across said optic axis at conjugate foci of said projection system whose ratio is equal to the ratio of respective 35 mm. and 16 mm. film frame heights, and at relative linear speeds whose ratio is equal to the ratio of the pitch distances of the films, whereby the film strips are synchronized frame-for-frame, said last-mentioned means comprising 35 mm. and 16 mm. film sprockets whose number of teeth are in the ratio of 4-to-1, fixed to one another, giving a linear speed reduction ratio of 2.5-to-1, and said conjugate foci being so related as to give an optical reduction ratio of 2.15-to-1, and all in such manner that, upon illumination of the 35 mm. film, the optical projection system forms, on the sensitized film, successive contiguous 16 mm. optical frame images of the spaced frames of the 35 mm. film, traveling at a speed greater than the speed of the sensitized film, an electronic flash lamp for illuminating said printing film, and circuit means synchronized with said film strips for intermittently flashing said lamp in step with passage of successive frame areas of said film strips across said optic axis.

References Cited in the file of this patent

UNITED STATES PATENTS

| | | |
|---|---|---|
| 1,786,220 | Owens | Dec. 23, 1930 |
| 1,801,450 | Owens | Apr. 21, 1931 |
| 2,453,031 | Olds | Nov. 2, 1948 |
| 2,473,625 | Wheeler | June 21, 1949 |